(12) United States Patent
Moore et al.

(10) Patent No.: US 8,424,405 B2
(45) Date of Patent: Apr. 23, 2013

(54) GEARBOX

(75) Inventors: Adrain Paul Moore, Cold Ash (GB); Andrew McDougall, Wokingham (GB); Anthony Tremlett, Abingdon (GB); Ian Foster, Reading (GB)

(73) Assignee: Xtrac Limited, Berkshire (GB)

( * ) Notice: Subject to any disclaimer, the term of this patent is extended or adjusted under 35 U.S.C. 154(b) by 858 days.

(21) Appl. No.: 12/565,117

(22) Filed: Sep. 23, 2009

(65) Prior Publication Data

US 2010/0101345 A1 Apr. 29, 2010

(30) Foreign Application Priority Data

Sep. 23, 2008 (GB) .................................. 0817412.0

(51) Int. Cl.
*F16H 3/08* (2006.01)
*F16D 47/04* (2006.01)
*F16D 41/04* (2006.01)

(52) U.S. Cl.
USPC ............ 74/368; 74/325; 192/48.6; 192/48.92

(58) Field of Classification Search ............... 74/325, 74/329, 368, 369, 370, 371, 372; 192/48.6, 192/48.91, 48.92
See application file for complete search history.

(56) References Cited

U.S. PATENT DOCUMENTS

| 2,015,096 | A | * | 9/1935 | Anderson | 74/337 |
| 4,093,049 | A |   | 6/1978 | Watson et al. | |
| 4,111,288 | A | * | 9/1978 | Fogelberg | 192/38 |
| 4,817,451 | A | * | 4/1989 | Weismann | 74/333 |
| 5,131,285 | A | * | 7/1992 | Weismann et al. | 74/333 |
| 5,178,250 | A | * | 1/1993 | Ashikawa et al. | 192/38 |
| 5,301,565 | A | * | 4/1994 | Weismann et al. | 74/336 R |
| 7,428,854 | B2 | * | 9/2008 | Moore et al. | 74/339 |
| 2006/0150760 | A1 | | 7/2006 | Maguire et al. | |
| 2007/0034032 | A1 | | 2/2007 | Moore et al. | |

FOREIGN PATENT DOCUMENTS

| DE | 1 131 958 | 12/1962 |
| DE | 10 2006 000 778 | 7/2006 |
| EP | 0 391 604 | 10/1990 |
| EP | 0 452 150 | 10/1991 |
| EP | 1 736 678 A2 | 12/2006 |
| EP | 1 736 678 A3 | 12/2006 |
| GB | 2 426 302 | 11/2006 |
| SU | 1237824 | 6/1986 |
| WO | WO 01/11272 | 2/2001 |

OTHER PUBLICATIONS

British Search Report dated Jan. 12, 2009 for Application No. GB 0817412.0.
European Search Report completed Jan. 14, 2010 for Application No. EP 09 25 1969.

* cited by examiner

*Primary Examiner* — Troy Chambers
*Assistant Examiner* — Michael Gonzalez
(74) *Attorney, Agent, or Firm* — Fay Sharpe LLP (57) ABSTRACT

A mainshaft assembly for a gearbox includes a mainshaft (44) and drive gears (31, 36) carried for rotation about the mainshaft. First and second hubs (50, 50') are associated with respective drive gears, each hub being operable to selectively couple or uncouple with the drive gear causing it to rotate with the hub or with respect to the hub. A drive connection mechanism (42, 64, 66) associated with each hub selectively connects the hub to the mainshaft. Upon connection of the hubs to the drive gears, the drive connection operates to connect one or other of the hubs to the mainshaft when torque is applied to the mainshaft in a first direction or an opposite direction. This enables a gear ratio to be selected by reversing the torque being handled by the gearbox.

23 Claims, 7 Drawing Sheets

GEARBOX

FIELD OF INVENTION

This invention relates to a gearbox. It has particular, but not exclusive, application for use in a high-performance motor vehicle such as a sports car or a racing car.

BACKGROUND

A conventional manual automotive gearbox has one particular disadvantage when applied to a vehicle from which maximum performance is to be extracted: it is necessary to remove engine torque from the input to the gearbox when the gear ratio is to be changed, typically by interrupting drive through a friction clutch. This results in the acceleration of the vehicle being interrupted during the period for which the clutch is open. In a conventional gearbox, it is necessary to remove torque from immediately before a currently-selected gear is disengaged until a new gear is selected.

The most common arrangement in general automotive use mounts a gear onto a hub using a bearing or bush arrangement. The hub is joined to the gear shaft through a splined or similar coupling. Mounted on the hub is a sliding ring system which can slide on the hub to engage a gear in order to couple that gear to the hub for rotation, thus permitting drive to pass from the gear to the shaft. In some instances the hub may be integral with the gear shaft. The sliding ring system can be either a dog clutch ring or a synchronizer ring assembly; many different sizes and types are available. In a sequential gearbox, the sliding ring system is actuated by a selector fork, which in turn is actuated by the rotation of a gearchange barrel upon which is a cam profile. As the barrel is rotated the cam profile causes the correct selector fork to move at the correct time.

In operation of such a system, to effect a gearchange, one gear is de-selected, and then the subsequent gear selected. In order for the sliding ring system to engage and disengage with the gear the drive torque needs to be cut, this is typically done through the engine to gearbox clutch and/or an electronic engine cut. A cut in the engine torque for the required time to allow the gear to disengage results in the rate of vehicle acceleration being reduced. In certain applications, for example in motor sport, it is not desirable for the vehicle acceleration rate to reduce during a gear change.

A gearbox that allows a driver to make a gear change without the requirement to remove drive torque was disclosed by the present applicant in EP-A-1 736 678. Such a gearbox allows a driver to perform gear changes without interrupting drive power by arranging for drive hubs to be selectively connected to and disconnected from a drive gear in accordance with the rotational direction of torque between the hub and the gear: in other words, in accordance with whether the gear is tending to drive the hub or the gear is overrunning the hub.

SUMMARY

An aim of this invention is to improve the operation of the gearbox disclosed in EP-A-1 736 678.

To this end, from a first aspect, this invention provides a mainshaft for a gearbox assembly, the mainshaft assembly comprising:
a mainshaft;
a first and a second drive gear, each carried for rotation about the mainshaft, each drive gear having a different number of teeth;
a first and a second hub, each hub being associated with a respective drive gear, each hub having engagement means operable to selectively couple with the drive gear causing it to rotate with the hub or uncouple from the drive gear to allow the drive gear to rotate with respect to the hub;
respective drive connection means associated with each hub being operative to connect the hub to the mainshaft for rotation with it or to allow rotation with respect to it, the connection means including connection elements having a deployed position in which they prevent relative movement between the hub and the mainshaft and a withdrawn position in which such relative movement is allowed;
in which, upon connection of both first and second hub by their respective engagement means to each corresponding drive gear, the drive connection means operates to connect one of the hubs to the mainshaft when torque is applied to the mainshaft through the hub and to connect the other one of the hubs to the mainshaft when torque is applied to the hub through the mainshaft; wherein
the drive connection means includes control means which, in an engaged condition, causes the connection elements to adopt their deployed position, and in a disengaged condition, allows the connection elements to be moved against a biasing force to their withdrawn position.

The presence of the biasing force ensures rapid engagement of the drive connection means when they are required to transmit drive.

Each connection element is typically a generally cylindrical pawl.

In a typical embodiment, in the withdrawn position, each connection element can be received within a respective recess in one of the mainshaft and the hub.

At least part of the biasing force may be provided by one or more springs within the hub. For example, each spring may be generally C-shaped and extend circumferentially partly around the mainshaft. Preferably, each spring is prevented from rotating about the mainshaft by one of the connection elements. Alternatively or additionally, at least part of biasing force may be provided by a helper assembly located within the mainshaft. The helper assembly may comprise a resiliently biased plunger that acts upon a pawl.

The control means may comprise a hollow cylindrical cage that surrounds the mainshaft and which extends between the hubs and the mainshaft. The cage typically includes slots within each of which a connection element is located. The cage may be formed of two coaxial components interconnected such that limited backlash movement can take place between them. In such embodiments, the slots may have a circumferential extent that is marginally greater than the diameter of the connection elements. Alternatively, the cage may formed of two coaxial components interconnected such that minimal backlash movement can take place between them or of a single coaxial component. In such embodiments, the slots may have a circumferential extent that is greater than the diameter of the connection elements to allow backlash movement between the cage and the connection elements.

Each engagement means typically includes a dog clutch that can engage with or disengage from dogs on a drive gear.

From a second embodiment, the invention provides a gearbox that includes a mainshaft assembly embodying the first aspect of the invention.

In such a gearbox, the drive gears of the mainshaft assembly may be in mesh with a respective laygear. The laygears are typically constrained to rotate together on a layshaft.

BRIEF DESCRIPTION OF DRAWINGS

Embodiments of the invention will now be described in detail, by way of example, and with reference to the accompanying drawings, in which.

DETAILED DESCRIPTION

The embodiments described are five-speed or six-speed gearboxes intended for competition use. However, it will be seen that the principles of its construction could be extended in a straightforward manner to a gearbox having a smaller or larger number of speeds and different applications. The embodiments described may also provide some forward speeds in a gearbox in which further forward speeds are provided using conventional means.

Figure 1:
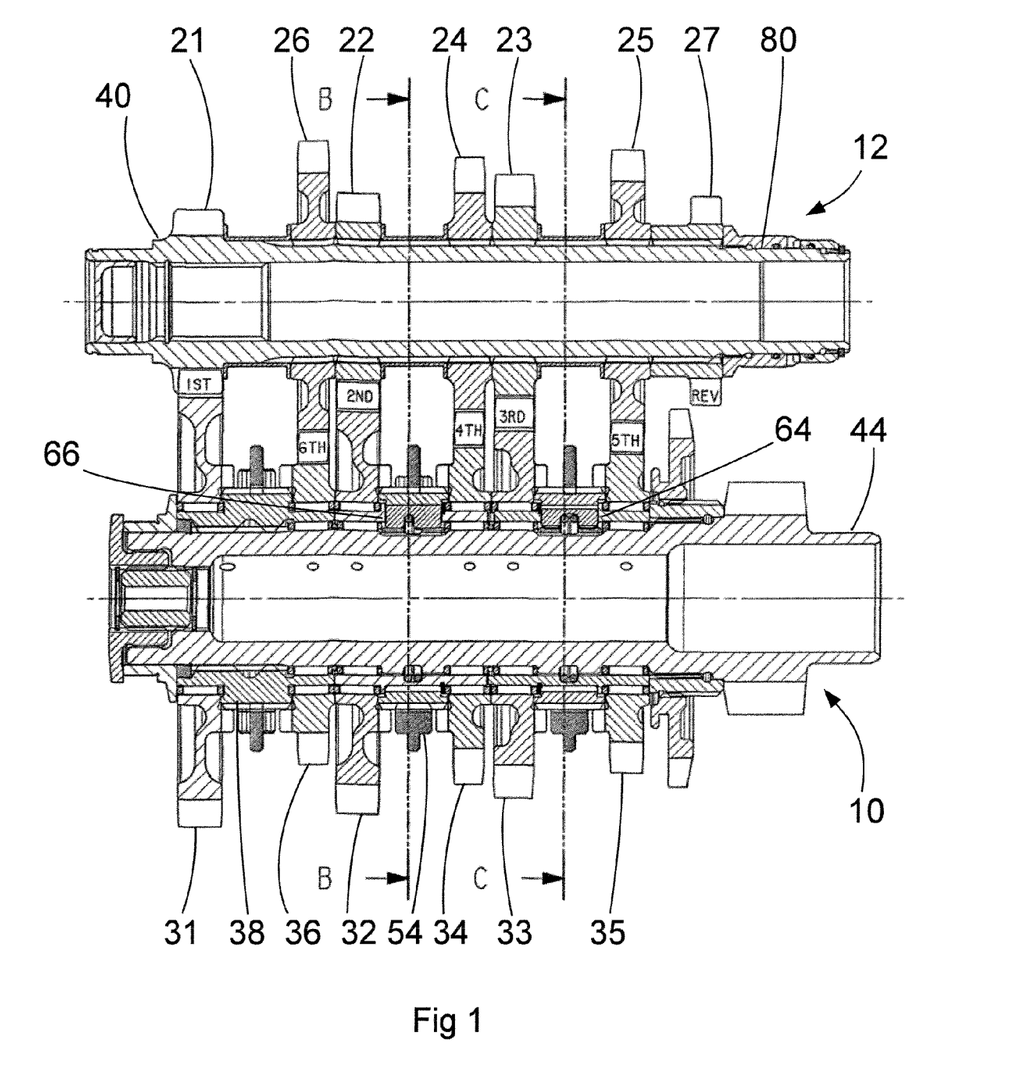
FIG. 1 is a longitudinal cross-section of layshaft and mainshaft assemblies of a six-speed gearbox being a first embodiment of the invention.
Figure 2:
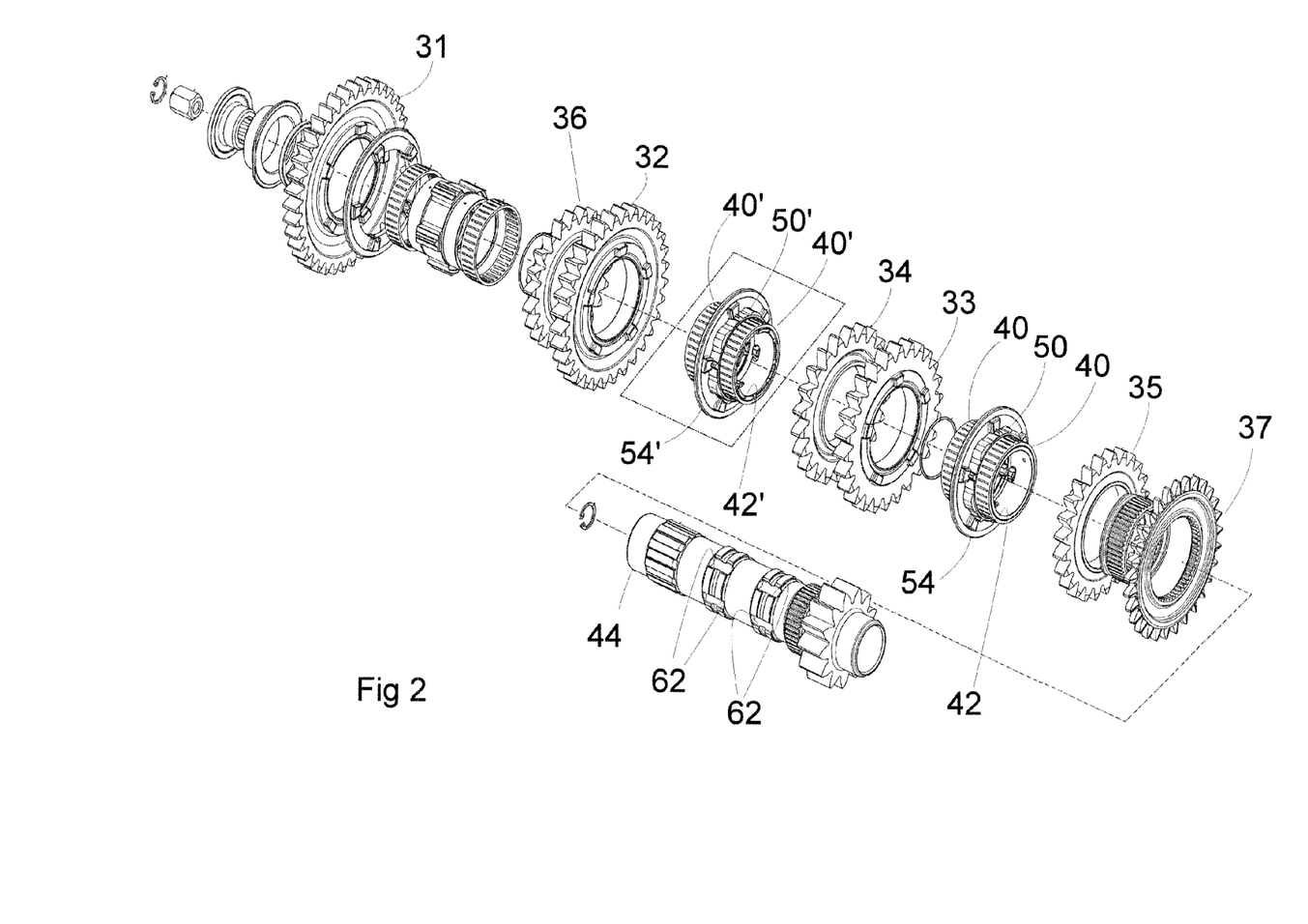
FIG. 2 is an exploded view of the mainshaft assembly shown in FIG. 1.
Figure 3:
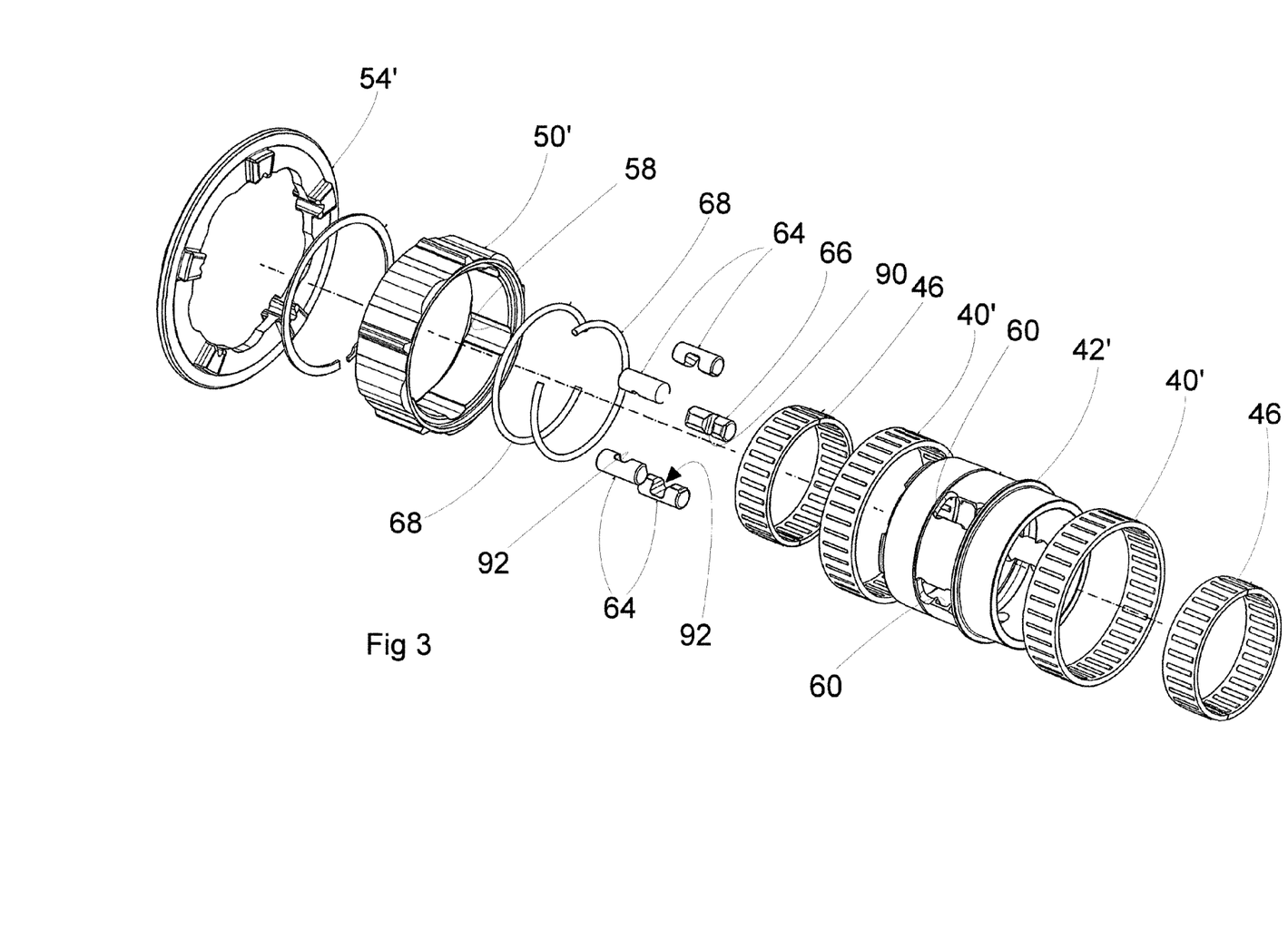
FIG. 3 is an exploded view of a hub assembly shown in FIG. 2.

With reference first to FIGS. 1 to 3, the gearbox comprises two principal shaft assemblies—a mainshaft assembly 10 and a layshaft assembly 12. Drive from the engine passes through the clutch and enters the gearbox to drive the layshaft assembly 12. The output of the gearbox is taken from the mainshaft assembly 10. Ratio selection is performed on the mainshaft and is controlled by a selector assembly.

The layshaft assembly 12 comprises six differently-sized forward-speed spur laygears 21 . . . 26 and a reverse spur laygear 27 carried upon a rotatable shaft 80 for rotation about an axis within the gearbox. The spur gears 21 . . . 27 and the layshaft 80 are coupled by splines so that they rotate together; that is to say, relative rotation between the spur gears is prevented.

The mainshaft assembly 10 has six forward-speed spur gears 31 . . . 36 each of which is in mesh with a respective spur laygear 21 . . . 26 of the layshaft assembly 12, and a reverse-speed spur gear 37 that can be brought into mesh with the reverse spur laygear 27 through an idler gear (not shown) when reverse gear is selected. The sizes of the spur gears 31 . . . 37 are such that they are arranged along the straight axis of a mainshaft 44 that is parallel to the axis of the layshaft 80. The mainshaft assembly is central to the operation of this embodiment, so it will now be described in detail with reference to FIGS. 2 and 3.

The six forward-speed spur gears 31 . . . 36 of the mainshaft assembly provide $1^{st}$ to $6^{th}$ speeds, the six speeds being each incrementally higher in ratio than the previous gear, i.e., $6^{th}$ is higher than $5^{th}$, and so forth. The gears are not arranged in ratio-order as is common in most gearboxes. Rather, they are arranged such that a first adjacent pair of gears 31, 36 provide $1^{st}$ and $6^{th}$ gears, a second adjacent pair of gears (referred to as the even-speed pair) 32, 34 provide $4^{th}$ and $2^{nd}$ gears respectively, while a third pair (referred to as the odd-speed pair) 33, 35 provide $3^{rd}$ and $5^{th}$ gears respectively. The requirement in general is that adjacent speeds should not share a hub so that a speed change can be effected by changing which one of two hubs is transmitting drive to the mainshaft.

Note that, in this embodiment, the pair of gears 31, 36 that provide the $1^{st}$ and $6^{th}$ speeds are connected to the mainshaft 44 using a conventional selector hub 38, and do not make use of the change system provided by this invention; nor does the reverse gear 37. Therefore, the following description will describe the operation of the odd-speed pair and the even-speed pair, which do benefit from the arrangement of the present invention.

Each spur gear 32 . . . 35 is supported on a respective bearing 40, 40' which in turn is mounted on a two-component cage 42, 42' that extends under all four gears. The cage 42 is carried on the rotatable mainshaft 44. (The bearings 40, 40' could be bushes rather than rotating element bearings, as in this embodiment.) The components 42, 42' of the cage are carried on bearings 46 mounted on the mainshaft 44 such that they can rotate upon the mainshaft 44. In alternative embodiments, bushes might replace the bearings, or the cage may be carried directly upon the mainshaft 44.

Mounted on each component 42, 42' of the cage between the gears of the odd-speed pair and the even-speed pair, concentric to the mainshaft 44, is a respective hub 50, 50'. Mounted on each hub 50, 50' is a respective dog ring 54, 54' which, in this embodiment, is connected to the hub through a spline drive. Thus, the dog rings 54, 54' can slide axially with respective to the corresponding hub 50, 50', but cannot rotate with respect to it. Each dog ring 54, 54' can slide between three operative positions: a central neutral position in which it is spaced axially from both of the corresponding spur gears, or displaced from the central position in one or other direction to a respective drive position to engage one or other spur gear. When in a drive position, the dog ring 54, 54' engages with dog formations on the corresponding spur gear to lock that gear to the corresponding hub 50, 50' upon which it is carried such that the hub and the gear rotate together. This sliding movement is effected by selector forks of the selector assembly.

Each hub 50, 50' has a series of internal axially-aligned grooves 58 and is mounted on a respective component of the cage 42, 42'. In this example, there are five such grooves, but other embodiments may have more or fewer. Each cage component 42, 42' has a series of rectangular slots 60, each slot 60 being disposed approximately radially inwardly from a respective one of the grooves 58. Likewise, the mainshaft 44 has a series of grooves 62, each being disposed approximately radially inwardly from a respective one of the slots 60. Thus, a space is enclosed between the internal grooves 58 of the hubs 50, 50', the slots 60 and the grooves 62 of the mainshaft 44 and located within each space is a respective pawl 64, 66 of generally cylindrical outer shape.

Figure 6:
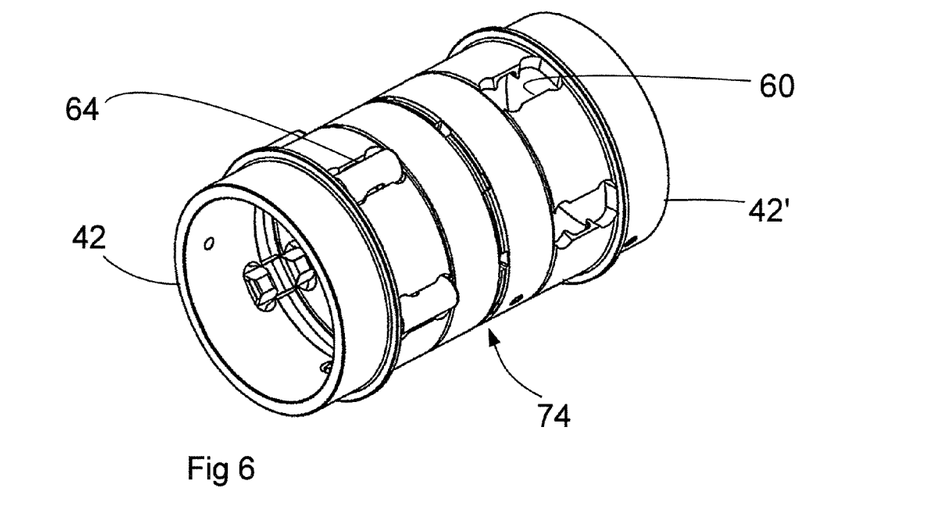
FIGS. 6 and 7 show cage assemblies being two alternative components of the embodiment of FIG. 1.
Figure 7:
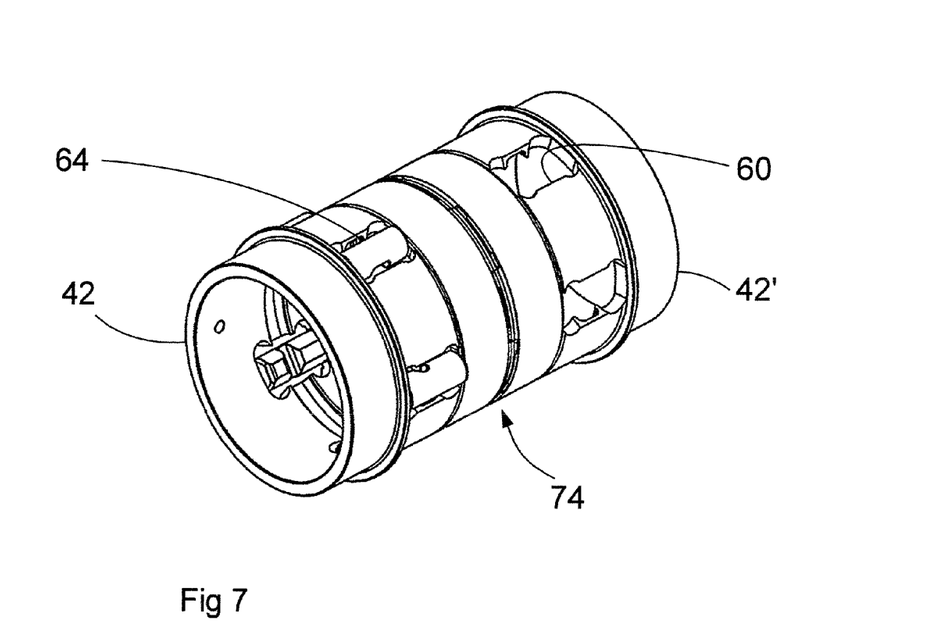

The cage may be in several configurations, two of which are shown in FIGS. 6 and 7 respectively. Proximal end faces of the components 42, 42' of the cage have castellated formations at 74 that couple them together. In the first arrangement, shown in FIG. 6, the slots 60 have a width just greater than the diameter of the pawls 64, 66. Thus, the pawls 64, 66 are constrained to rotate about the mainshaft 44 along with the cage component 42, 42' in which they are located. The castellated formations 74 are configured to allow some limited rotational backlash movement between the components 42, 42' of the cage. In the second arrangement, shown in FIG. 7, the slots 60 have a width somewhat greater than the diameter of the pawls 64, 66. Thus, the pawls 64, 66 are caused to rotate about the mainshaft 44 along with the cage component 42, 42' in which they are located, with some backlash as the pawls 64, 66 move from one side of their slots 60 to the other. The castellated formations 74 are configured to minimise rotational backlash movement between the components 42, 42' of the cage.

The grooves 58 of the hubs 50, 50' are curved such that each pawl 64, 66 fits closely to the base of its groove 58. The bases of the grooves 62 of the mainshaft 44 are also curved with a radius similar to that of the pawls 64, 66. However, each of the grooves 62 of the mainshaft 44 has sloping sidewalls upon which the pawls 64, 66 can slide, thus allowing the pawls 64,66 a small amount of angular rotation around the mainshaft. The width of each slot 60 is slightly greater than the diameter of a pawl 64, 66. When a pawl is located in the base of its mainshaft groove 62, its radially outermost extent does not project beyond the radially outer surface of the components 42, 42' of the cage.

Each pawl 64, 66 is generally cylindrical, and has a transverse slot 90,92 formed in it. Two of the pawls 66 have a slot 90 that is of width approximately a quarter of the length of the pawl 66, and offset such that one transverse edge of the slot 90 is approximately at the mid-point of the length of the pawl 66. These are referred to as "anti-rotation pawls". The remaining pawls 64 have a slot 92 that is of width approximately a half of the length of the pawl 64, and is substantially mid-way along of the length of the pawl 64. These are referred to as "locking pawls". When assembled, the anti-rotation pawls 66 are separated from one another by at least one locking pawl 64, and the slots 90 of the anti-rotation pawls are offset in axially opposite directions along the mainshaft 44.

A pair of C-shaped springs 68 surrounds the mainshaft 44. The natural diameter of the springs 68 is somewhat larger than that of the mainshaft 44. When compressed to closely surround the mainshaft 44, the free ends of the springs 68 are spaced from one another by a distance greater than the diameter of the pawls 64, 66. Both springs 68 pass within the slots 92 of all of the locking pawls 64. However, the slots 90 of the anti-rotation pawls 66 are wide enough to receive just one spring 68. Thus, each spring 68 passes through the slot 90 of one anti-rotation pawl 66, and its free ends are disposed on opposite sides of the other anti-rotation pawl 66. This prevents rotation of the springs 68 about the mainshaft 44.

The slots 60 in the components 42, 42' of the cage are sized to allow the pawls 64,66 to disengage from the hubs 50, 50' as required during operation. The cage ensures that all of the pawls 64 under any one hub 50, 50' are aligned on the same side of the grooves 62 in the mainshaft 44 as required during operation of the system. The purpose of the pawls 64, 66 is to allow the hubs 50, 50' to be coupled to or uncoupled from the mainshaft 44, whereby when coupled, a hub 50, 50' is caused to rotate with the mainshaft 44 and when uncoupled can rotate with respect to it. The mechanism by which this occurs will now be described.

Consider first the state of the mainshaft assembly 10 as shown in FIG. 1. Both dog rings 54, 54' are in their central positions, so all of the spur gears 31 . . . 36 are free to rotate with respect to the mainshaft 44, and the cage components 42, 42' and pawls 64, 66 are free. Thus, the gearbox is in neutral, no drive being transmitted from the layshaft assembly 12 to the mainshaft assembly 10.

Figure 4:
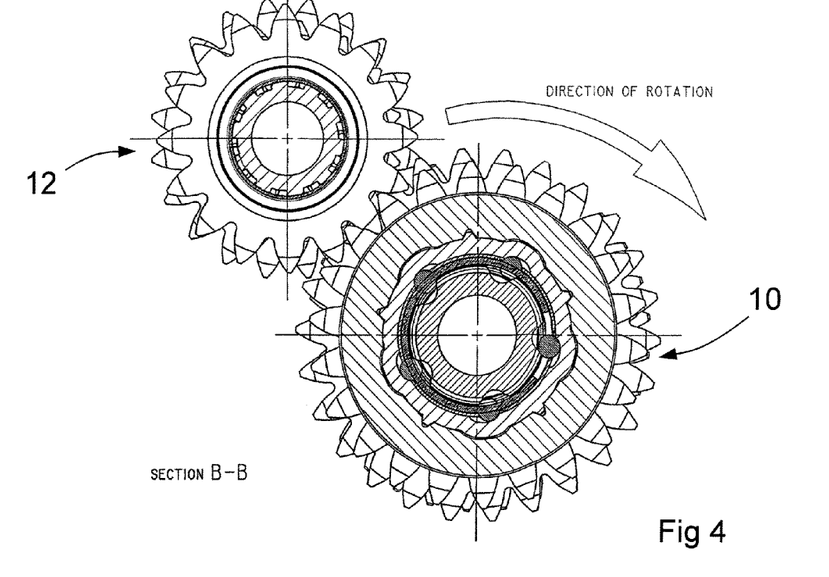
FIG. 4 is a section on B-B of FIG. 1, showing the odd-speed hub of the first embodiment in a drive condition.

When driving in $4^{th}$ gear, the dog ring 54' of the even-speed pair is located in its drive position with respect to the 4th spur gear 34. Section B-B through 4th gear in FIG. 4 shows the drive where the torque is taken through the even-speed hub 50' and the pawls 64, 66 into the mainshaft 44. The cage 42 is rotated fully in the direction of the drive torque by the pawls 64, 66.

Figure 5:
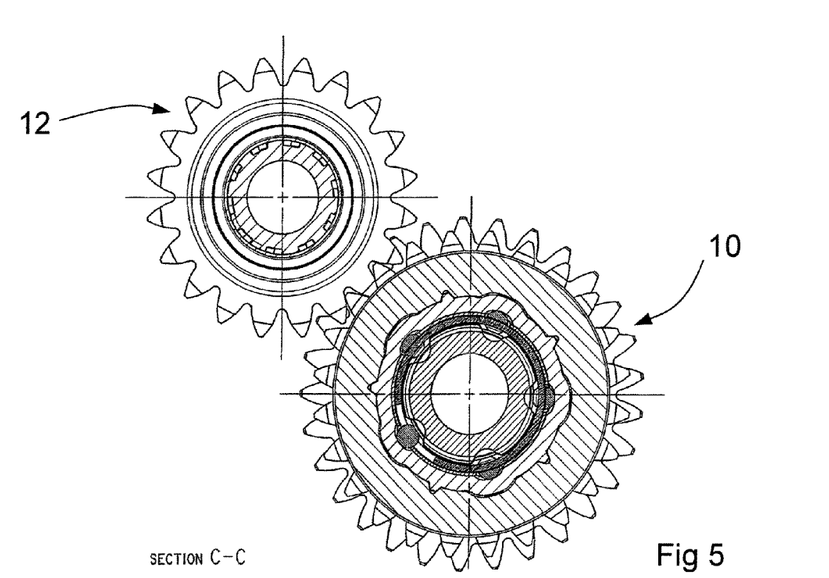
FIG. 5 is a section on C-C of FIG. 1, showing the even-speed hub of the first embodiment in a ratchet condition.

If the vehicle is accelerating, it may be necessary to change up a gear, for example from $3^{rd}$ gear to $4^{th}$ gear. Initially, the $3^{rd}$ gear 33 will be engaged through the odd-speed hub 50. To perform the gearchange, the $4^{th}$ spur gear 34 is engaged on drive by dog ring 54' of the even-speed pair. Note that $3^{rd}$ gear 36 is also still engaged by the dog ring 54 of the odd-speed pair. Section B-B through the even speed hub 50' shows that as the $4^{th}$ gear is engaged the drive torque is taken through the even-speed hub 50' and pawls 64, 66 to the mainshaft 44. The pawls 64, 66 have rotated the cage 42, 42' fully in the direction of the drive torque due to the drive torque. Section C-C in FIG. 5 through the odd-speed hub 50 shows that, due to the fact that the mainshaft 44 is now rotating faster than $3^{rd}$ gear (which is still engaged) the odd-speed hub 50 is now rotating slower than the even-speed hub 50'. As the cage 42 is forced fully in the direction of the drive torque by the even-speed hub 50' and pawls 64, 66 there is now sufficient space for the $3^{rd}$ gear pawls 64, 66 to be forced into the grooves in the mainshaft 44 against the action of the springs 68. This allows the odd-speed hub 50 to rotate slower than even-speed hub 50' and therefore not transmit drive. Thus, $4^{th}$ gear has been engaged without the need to disengage $3^{rd}$ gear.

Once $4^{th}$ gear has been engaged, as described above, the dog ring 54 of the odd-speed pair is withdrawn from engagement with the $3^{rd}$ forward-speed spur gear 33 to its central neutral position. The even-speed hub dog ring 54' remains in engagement with the $4^{th}$ spur gear 34. The $3^{rd}$ spur gear 33 is now free to rotate on its bearing 40 as it is no longer joined to the odd-speed hub 50 by dog ring 54—this is essential because there is no relative rotational motion between the odd-speed hub 52 and mainshaft 44.

The sequence of operation to accomplish downchanges, with the example being from $4^{th}$ to $3^{rd}$ speeds, will now be described.

Before a downchange, engine torque is reduced such that it is now imposing a drag on the vehicle—that is, the direction of torque being transmitted by the gearbox is reversed. Once drive torque is removed, the even-speed hub will move rotationally in the opposite direction to the direction of rotation relative to the mainshaft 44, and this will also rotate the pawls 64, 66 in the same relative direction. The pawls 64, 66 are urged radially outwardly by the springs 68, ready to transmit drive. The coast torque is transmitted from the mainshaft 44 through the pawls 64, 66 into the even-speed hub 50' and thence to the even-speed dog ring 54' and the $4^{th}$ speed spur gear 34. The change in torque direction also forces the cage 42 to move to a coast position. The coast torque is now being taken by the slower gear, the torque path being from $3^{rd}$ gear 33, through the odd-speed dog ring 54, the odd-speed hub 50 and the pawls 64, 66 into the mainshaft 44. The pawls 64, 66 are forced in the opposite direction to the direction of rotation by the odd-speed hub 50. The cage 42 is already in the coast position because of the drive direction. The even-speed hub 50' is rotating faster than the odd-speed hub 50 and therefore forces the pawls 64, 66 into the grooves 62 in mainshaft 44 against the action of the springs 68 which allows the hub to rotate with respect to the mainshaft 44, as shown in section C-C.

Figure 8:
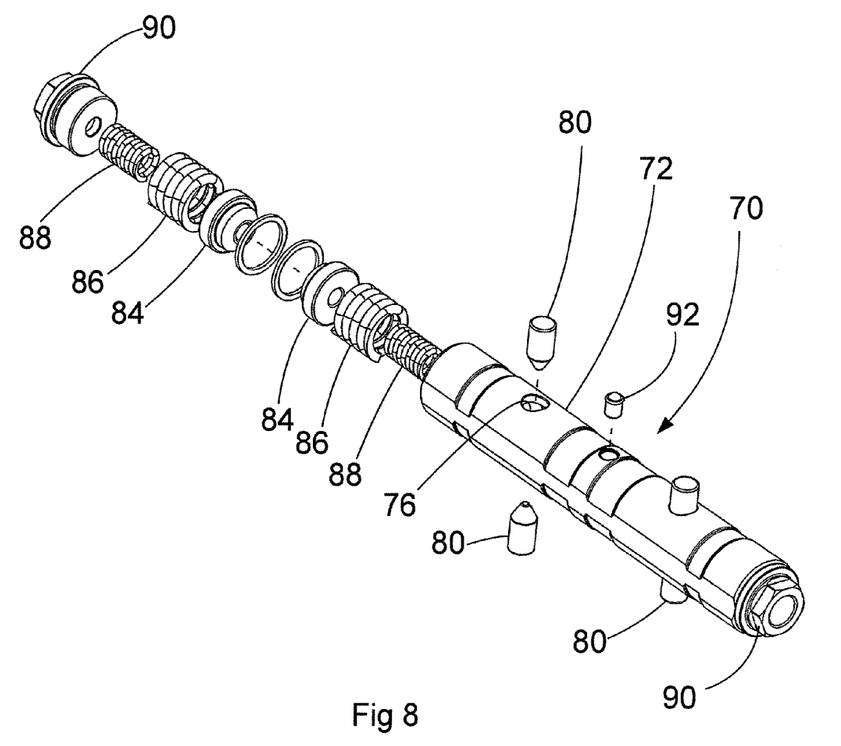
FIG. 8 shows a helper assembly for use in embodiments of the invention.
Figure 9:
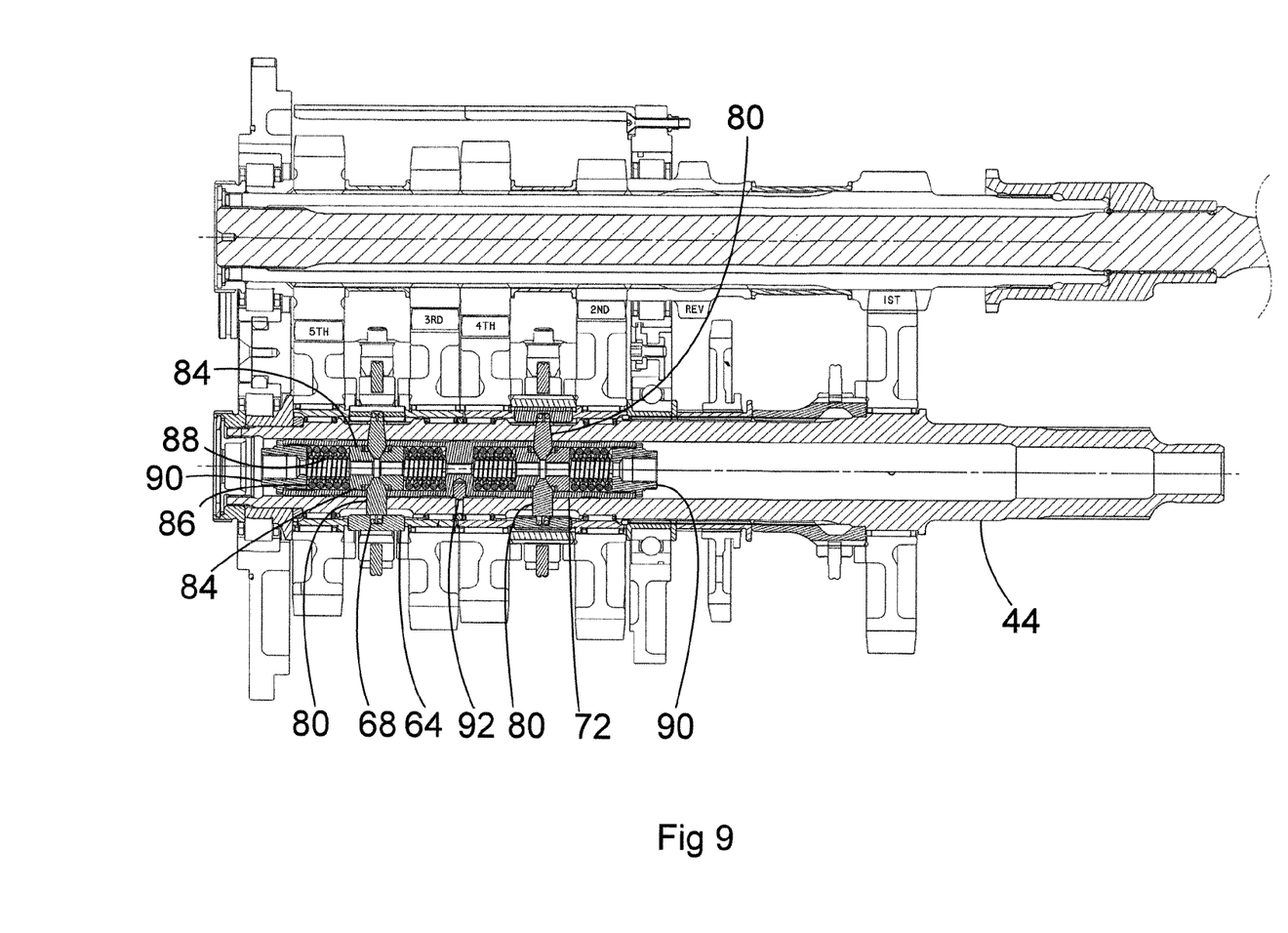
FIG. 9 shows the helper assembly of FIG. 8 installed in a mainshaft.

A helper assembly 70 that can be incorporated into the mainshaft 44 is shown in FIGS. 8 and 9. This helper assembly 70 serves to apply a radial force to the pawls 64, 66 additional to that of the springs 68.

The helper assembly 70 comprises a tubular casing 72 that has an axial through bore and that is symmetrical about a centre plane normal to the axis. The bore has a central region of reduced diameter, and its end portions are internally threaded. The casing has an external diameter that is a close fit within the mainshaft 44. A ball-spring plunger 92 is located centrally in the casing 72, projecting radially outwardly from it. The ball-spring plunger cooperates with an internal groove of the mainshaft 44 to resist axial movement of the helper assembly 70 within the bore of the mainshaft 44.

At positions that are radially inward of the pawls 64,66 when the helper assembly is installed for use, radial apertures 76 are formed through the casing 72 to communicate with the bore. A respective plunger 80 is located within each radial aperture 76. Each plunger 80 has a tapered portion that is directed into the bore of the mainshaft 44.

Each plunger 80 is acted upon by two expander elements 84 that are located to slide within the bore of the casing 72. Each of the two expander elements 84 has a chamfered axial face that face one another and which bear upon the tapered portions of the plungers 80. Each expander element 84 is acted upon by a pair of coaxial helical springs or a series of Belleville compression springs 86, 88, whereby the two expander elements 84 that are associated with each plunger 80 are urged towards one another. The compression springs 86, 88 that are associated with the expander elements 84 closest to the centre plane of the casing 72 bear upon the central region of reduced diameter. The compression springs 86, 88 that are associated with the expander elements 84 furthest from the centre plane of the casing 72 are retained by plugs 90 secured within the threaded end portions of the bore of the casing 72. Alternatively, the bore might have a groove within which a circlip can be located to retain the springs. The action of the expander elements 84 acting on the plungers 80 causes the plungers 80 to be urged radially outwardly from the housing to bear upon the pawls 64, 66, thereby urging the pawls radially outwardly to supplement the action of the springs 68.

The invention claimed is:

1. A mainshaft assembly for a gearbox, the mainshaft assembly comprising:
   a mainshaft;
   a first and a second drive gear, each carried for rotation about the mainshaft;
   a first and a second hub, each hub being associated with a respective drive gear, each hub including engagement means operable to selectively couple the hub with the drive gear causing the drive gear to rotate with the hub or uncouple the hub from the drive gear to allow the drive gear to rotate with respect to the hub;
   respective drive connection means associated with each hub being operative to connect the hub to the mainshaft for rotation with the mainshaft or to allow rotation with respect to the mainshaft, the connection means including connection elements having a deployed position in which the connection elements prevent relative movement between the hub and the mainshaft and a withdrawn position in which such relative movement is allowed;
   in which, upon connection of both the first and second hubs by their respective engagement means to each corresponding drive gear, the drive connection means operates to connect one of the hubs to the mainshaft when torque is applied to the mainshaft through the hub and to connect the other one of the hubs to the mainshaft when torque is applied to the other one of the hubs through the mainshaft; wherein
   the drive connection means includes biasing means providing a biasing force that causes the connection elements to adopt their deployed position, and control means which, in an engaged condition, retains the connection elements in their deployed position, and in a disengaged condition, allows the connection elements to be moved against the biasing force to their withdrawn position.

2. A mainshaft assembly according to claim 1 in which each connection element comprises a generally cylindrical pawl.

3. A mainshaft assembly according to claim 1 in which in the withdrawn position, each connection element is received within a respective recess in one of the mainshaft and the hub.

4. A mainshaft assembly according to claim 1 in which at least part of the biasing force is provided by one or more springs within the hub.

5. A mainshaft assembly according to claim 4 in which each spring is generally C-shaped.

6. A mainshaft assembly according to claim 5 in which each spring extends circumferentially partly around the mainshaft.

7. A mainshaft assembly according to claim 6 in which each spring is prevented from rotation about the mainshaft by one of the connection elements.

8. A mainshaft assembly according to claim 1 in which the at least part of biasing force is provided by a helper assembly located within the mainshaft.

9. A mainshaft assembly according to claim 8 in which the helper assembly comprises a resiliently biased plunger that acts upon a pawl.

10. A mainshaft assembly according to claim 1 in which the control means comprises a hollow cylindrical cage that surrounds the mainshaft and extends between the hubs and the mainshaft, and that includes slots within each of which a connection element is located.

11. A mainshaft assembly according to claim 10 in which the cage is formed of two coaxial components interconnected such that limited backlash movement can take place between them.

12. A mainshaft assembly according to claim 11 in which the slots have a circumferential extent that is marginally greater than the diameter of the connection elements.

13. A mainshaft assembly according to claim 10 in which the cage is formed of two coaxial components interconnected such that minimal backlash movement can take place between them.

14. A mainshaft assembly according to claim 10 in which the cage is formed of a single coaxial component.

15. A mainshaft assembly according to claim 13 in which the slots have a circumferential extent that is greater than the diameter of the connection elements to allow backlash movement between the cage and the connection elements.

16. A mainshaft assembly according to claim 1 in which each engagement means includes a dog clutch that can engage with or disengage from dogs on a drive gear.

17. A mainshaft assembly according to claim 1, wherein said mainshaft assembly is installed in a gearbox.

18. A mainshaft assembly according to claim 17 in which each of the drive gears of the mainshaft assembly is in mesh with a respective laygear in the gearbox.

19. A mainshaft assembly according to claim 18 in which the laygears are constrained to rotate together on a layshaft.

20. A mainshaft assembly according to claim 17, wherein said gearbox comprises a selector assembly operable to engage or disengage the engagement means.

21. A mainshaft assembly according to claim 20 in which the selector assembly is a sequential selector.

22. A mainshaft assembly according to claim 19 in which the layshaft is an input to said gearbox and the mainshaft is an output from said gearbox.

23. A gearbox comprising:
a mainshaft assembly, said mainshaft assembly comprising:
a mainshaft;
a first drive gear and a second drive gear, each carried for rotation about the mainshaft;
a first hub and a second hub, each hub being associated with a respective one of said first and second drive gears, each hub including engagement means selectively operable to couple the hub with its associated drive gear causing the associated drive gear to rotate with the hub or to uncouple the hub from its associated drive gear to allow the associated drive gear to rotate with respect to the hub;
first and second drive connection means associated respectively with the first and second hubs, each drive connection means being operative to connect the respective hub to the mainshaft for rotation with the mainshaft or to allow rotation of the respective hub with respect to the mainshaft, each drive connection means including connection elements having a deployed position in which the connection elements prevent relative movement between the respective hub and the mainshaft and a withdrawn position in which such relative movement is allowed;
wherein, upon connection of the first and second hubs by their respective engagement means to the associated first and second drive gears, respectively, the respective drive connection means operate to connect one of the first and second hubs to the mainshaft when torque is applied to the mainshaft through said one hub and to connect the other of the first and second hubs to the mainshaft when torque is applied to said other hub through the mainshaft; and,
each drive connection means comprising biasing means providing a biasing force that causes the connection elements to adopt their deployed position, and comprising control means which, in an engaged condition, retains the connection elements in their deployed position, and in a disengaged condition, allows the connection elements to be moved against the biasing force to their withdrawn position.

\* \* \* \* \*